US008630319B2

(12) United States Patent
Pazhyannur et al.

(10) Patent No.: US 8,630,319 B2
(45) Date of Patent: Jan. 14, 2014

(54) MULTI-RECEIVER COMBINING FOR DISTRIBUTED ANTENNA SYSTEMS WITH CODE DIVISION MULTIPLE ACCESS RADIO FREQUENCY UPLINK SOURCES

(75) Inventors: Rajesh Pazhyannur, Milpitas, CA (US); Fred Jay Anderson, Lakeville, OH (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 13/079,828

(22) Filed: Apr. 5, 2011

(65) Prior Publication Data

US 2012/0257516 A1  Oct. 11, 2012

(51) Int. Cl.
*H04J 3/02* (2006.01)

(52) U.S. Cl.
USPC ............ 370/537; 370/538; 370/252; 370/254

(58) Field of Classification Search
USPC .......... 370/394, 474, 503, 532–540, 252–254
See application file for complete search history.

(56) References Cited

U.S. PATENT DOCUMENTS

| 8,085,782 B2 * | 12/2011 | Fahldieck | 370/394 |
| 2009/0122745 A1 * | 5/2009 | Fahldieck | 370/315 |
| 2009/0168916 A1 * | 7/2009 | Song et al. | 375/267 |
| 2010/0178936 A1 | 7/2010 | Wala et al. | |
| 2011/0190005 A1 * | 8/2011 | Cheon et al. | 455/456.1 |
| 2012/0176982 A1 * | 7/2012 | Zirwas et al. | 370/329 |
| 2012/0188960 A1 * | 7/2012 | Hultell et al. | 370/329 |
| 2012/0230281 A1 * | 9/2012 | Harada et al. | 370/329 |

OTHER PUBLICATIONS

Lin Dai et al., "Capacity Analysis in CDMA Distributed Antenna Systems," IEEE Transactions on Wireless Communications, vol. 4, No. 6, Nov. 2005.

* cited by examiner

*Primary Examiner* — Chuong T Ho
(74) *Attorney, Agent, or Firm* — Edell, Shapiro & Finnan, LLC (57) ABSTRACT

A distributed antenna system and related methods are provided to reduce interference among wireless mobile devices in a distributed antenna system. A combiner is provided that is configured to be coupled to a plurality of remote transceiver stations deployed in a coverage area and which wirelessly transmit downlink signals to and receive uplink signals from wireless mobile devices. A plurality of input streams that carry uplink signals transmitted by wireless mobile devices are received on individually assigned signal paths from each of the remote transceiver stations. At least one parameter of an input stream received from the one or more of the remote transceiver stations is monitored. A mapping function is determined based on the monitoring. The plurality of input streams are combined based on the mapping function to produce the two or more output streams and the two or more output streams are sent to corresponding receivers in a base station.

20 Claims, 9 Drawing Sheets

MULTI-RECEIVER COMBINING FOR DISTRIBUTED ANTENNA SYSTEMS WITH CODE DIVISION MULTIPLE ACCESS RADIO FREQUENCY UPLINK SOURCES

TECHNICAL FIELD

The present disclosure relates to distributed antenna systems.

BACKGROUND

Distributed antenna systems have been used to provide indoor or remote cellular coverage. A distributed antenna system consists of a centralized radio source, e.g., a base station, and multiple remote radio transceivers called "remote radio heads." The multiple remote radio heads connect to the centralized radio source over a combiner network, e.g., a local area network, when a digital system is employed or an analog network when fiber or coaxial networks are employed.

For transmissions from the base station to the remote radio heads, the signal from the base station may be digitized and converted to form digital baseband packets. The packets are multicast to the multiple remote radio heads over the local area network. At the remote radio heads, the digital signal is then converted to an analog signal and transmitted over the air to a mobile subscriber. Alternatively, analog signals may be transmitted directly to the remote radio heads, and the remote radio heads act as a repeater station. Similarly, for uplink signals, the uplink signals received at the remote radio heads from the mobile subscriber are sent in analog form, or are digitized and packetized, and then forwarded to the base station over the local area network.

DESCRIPTION OF EXAMPLE EMBODIMENTS

Overview

A distributed antenna system and related methods are provided to reduce interference among wireless mobile devices in a distributed antenna system. A combiner is provided that is configured to be coupled to a plurality of remote transceiver stations deployed in a coverage area and which wirelessly transmit downlink signals to and receive uplink signals from wireless mobile devices. A plurality of input streams that carry uplink signals transmitted by wireless mobile devices are received on individually assigned signal paths from each of the remote transceiver stations. At least one parameter of an input stream received from the one or more of the remote transceiver stations is monitored. A mapping function is determined based on the monitored parameter. The plurality of input streams are combined based on the mapping function to produce the two or more output streams and the two or more output streams are sent to corresponding receivers in a base station.

One of the plurality of input streams may be periodically selected for monitoring by the base station. Each of the input streams is selected in turn and sent to the base station for monitoring at the base station. The mapping function is determined for the one or more input streams to be combined by the combiner to the two or more output streams based on the at least one parameter associated with each of the periodically selected input streams. Information describing or identifying the mapping function is sent to the combiner.

Example Embodiments

Figure 1:
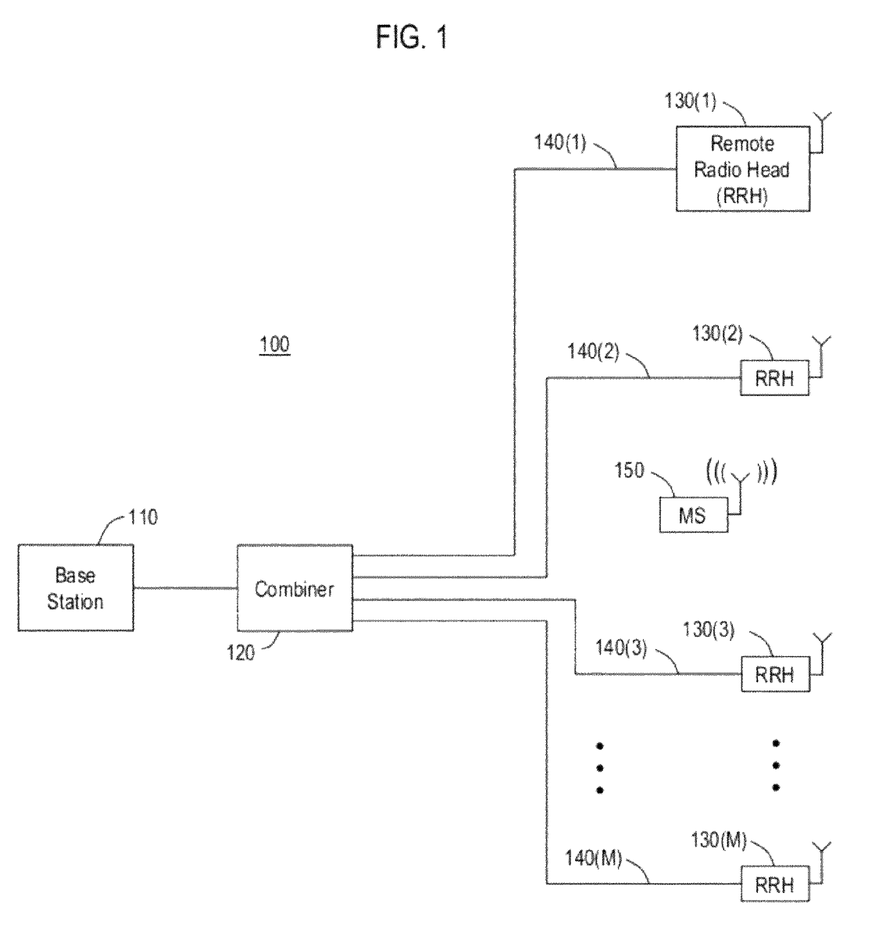
FIG. 1 is an block diagram showing an example of a network comprising a base station and a combiner that are configured to combine signals received from a plurality of remote radio head devices according to the techniques described herein.

Referring first to FIG. 1, an example of a system 100 is shown including a base station (BS) 110, a combiner 120, a plurality of remote radio transceivers 130(1)-130(M), and a wireless mobile station 150. The remote radio transceivers 130(1)-130(M) are also called "remote radio heads" (RRHs). The architecture shown in FIG. 1 is a "flat" architecture in which there are far fewer combiners relative to the number of RRHs, e.g., in this example there is one combiner 120 for M RRHs 130(1)-130(M). The BS 110 and the RRHs 130(1)-130(M) send and receive signals via individual data lines 140(1)-140(M) corresponding to each of the RRHs 130(1)-130(M) by way of combiner 120, which may also act as a splitter for downlink signals. The combiner 120 may be configured to combine digitized uplink signals from multiple RRHs at digital baseband or to combine analog uplink signals.

The various connections between the BS 110 and the RRHs 130(1)-130(M), e.g., data lines 140(1)-140(M), may be made by wired means, e.g., coaxial, Ethernet, or fiber optic cable, or by wireless means, e.g., over a WiFi™, WiMAX™ or other wireless communication system. While FIG. 1 shows a single BS 110 it should be understand that there may be multiple BSs in a system deployment.

The BS 110 and combiner 120 are configured to process and combine signals received from mobile subscribers, e.g., MS 150, using the services of system 100. Other network elements may be employed in system 100, e.g., routers, public switched telephone network connections, service provider gateways, Internet connections, or other base stations or wireless access points. The system 100 may be used to extend wireless communication coverage in areas that may not be easily serviced by traditional cellular base stations, e.g., malls, subways, buildings or building complexes that have interference or otherwise block radio frequency (RF) signals.

For downlink traffic, the BS 110 receives traffic destined for wireless mobile devices, and distributes the traffic to the RRHs 130(1)-130(M) for wireless transmission. The combiner 120 may also split downlink signals from the BS 110 for transmission to the RRHs 130(1)-130(M). For uplink traffic, the BS 110 receives uplink traffic via similar mechanisms with the combiner 120 acting as a traffic aggregator for the BS 110. Depending on wireless mobile device location, not all of the RRHs 130(1)-130(M) will receive uplink transmissions from wireless mobile devices. In other words, a given wireless mobile subscriber's uplink transmission will be received by only a subset of all the RRHs. By virtue of the non-orthogonality of the uplink signals of the individual mobile subscribers, if the signals of all RRHs are combined into a single output, mobile subscribers operating in system 100 will inherently interfere with each other and cannot be coherently combined.

The techniques and system architecture described herein mitigates such interference and increases the communication capacity of system 100. The process for limiting interference in system 100 will be described in connection with FIG. 7. Various architectures are described in connection with FIGS. 2, 3, 5, and 6, while root causes of mobile subscriber interference will be described in connection with FIG. 4. In general, the process or process logic for reducing mobile subscriber interference isolates signal paths from the RRHs such that signals from the RRHs can be intelligently combined, e.g., by monitoring signal parameters associated with each of the individual signal paths and then determining an appropriate combining function.

Figure 2:
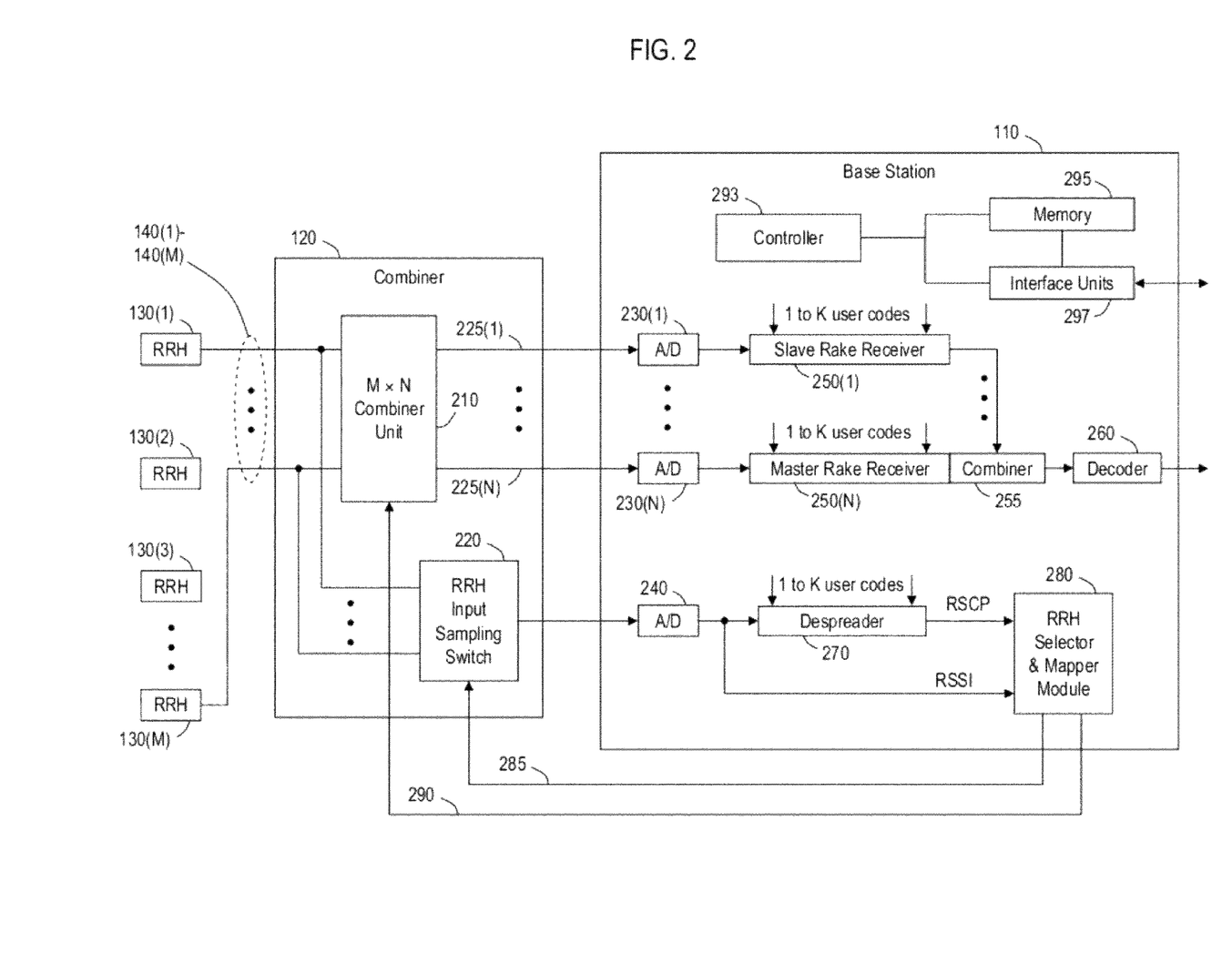
FIG. 2 is a system block diagram of an example combiner and base station combination configured to process signals from a plurality of remote radio heads according to the techniques described herein.

Referring to FIG. 2, an example combiner 120 and BS 110 are shown that are configured to process signals from a plurality of RRHs. FIG. 2 shows the BS 110, the combiner 120, and the plurality of remote radio transceivers 130(1)-130(M) from FIG. 1. The combiner 120 may receive uplink signals via individual data lines 140(1)-140(M), as shown collectively by the dashed oval.

The combiner 120 has an M×N combiner or mapper unit 210 and an RRH input sampling switch 220. The M×N combiner unit 210 is configured to combine the M input signals from data lines 140(1)-140(M) into N output signals on output lines 225(1)-225(N) based on a mapping function or other supplied information to be described hereinafter. In this example, signals on output lines 225(1)-225(N) are analog signals that are fed to respective analog-to-digital (A/D) converters 230(1)-230(N) within the BS 110 for conversion to digital signals. In the case of a digital distributed antenna system, the signals would already be a digital baseband and A/D conversion would not be provided. The digitized signals are then fed to respective rake receivers 250(1)-250(N). The N signal paths and corresponding receivers are referred to individually herein as a "radio chain". The rake receivers are fed user codes corresponding to K users known to be operating within system 100 in order to correlate multipath signals from each user.

In this example, rake receivers 250(1)-250(N-1) are designated as "slave" rake receivers and rake receiver 250(N) is designated a "master" rake receiver. The master-to-slave rake receiver relationship is described in connection with FIG. 3. The correlated multipath signals from each radio chain is then combined by combiner 255 and forwarded to decoder 260 for further processing.

Within the combiner 120, the input signals from data lines 140(1)-140(M) are tapped and fed to RRH input sampling switch 220. The RRH input sampling switch 220 selects one of the input signals to be monitored by the BS 110. The selected signal is sent to A/D converter 240 for conversion to a digital signal. One or more parameters associated with the digital signal are monitored by the BS 110. The output of the A/D converter 240 is sent through despreader 270. The output of the despreader 270 is sent to RRH selector and mapper function or module 280. In this example, the output of the despreader 270 is monitored for Received Signal Code Power (RSCP). Before the despreader 270, the digital signal is tapped and sent directly to RRH selector and mapper module 280 for Received Signal Strength Information (RSSI) monitoring. In another example, a carrier-to-interference ratio (CM) other known parameters may be monitored. The functions of the despreader 270 and the RRH selector and mapper module 280 may be implemented in the combiner 120 in instead of in the BS 110, or in a separate stand-alone device.

The RRH selector and mapper module 280 performs two functions. First, it provides a feedback signal 285 to the RRH input sampling switch 220 in order to periodically trigger switching through each of the input signal paths 140(1)-140(M). By periodically monitoring the input signals, the RRH selector and mapper module 280 can perform its second function by generating a mapping function for the M×N combiner unit 210. Data identifying or describing the mapping is sent to the combiner via communication line 290, e.g., by sending a message over an Ethernet interface. When M<=N, the mapping becomes trivial in that each of the M input signals can be mapped to its own radio chain, i.e., each RRH has its own dedicated radio chain. When M>N, the mapper module 280 determines an optimal mapping in which more than one RRH signal is mapped and combined into a single radio chain. An example RRH signal mapping will be described in connection with FIG. 8.

By using rake receivers 250 and despreader 270, it is understood that the BS 110 operates using a coded spread spectrum signal, e.g., according to a Code Division Multiple Access (CDMA) scheme. In the regard, the BS 110 may be a Wideband-CDMA (WCDMA) or Universal Mobile Telecommunication System (UMTS) Node B. Node B's would normally operate using a single rake receiver that resolves or correlates the multipath delays among the received multipath signals for each mobile subscriber. However, in this example a plurality of rake receivers are employed in order to reduce interference.

In CDMA systems, symbols or bits of data are encoded with chips that operate at a higher frequency than the underlying data. In this example the chips are derived using orthogonal codes, e.g., Walsh or Gold codes, and are referred to as pseudo-noise (PN) codes. Rake receivers use the orthogonal codes to resolve multipath signals and detect the underlying data, e.g., voice, video, or data for other services. The rake receiver acts as an equalizer in that it tracks each multipath signal individually, and then coherently combines them, i.e., a rake receiver operates as if it were many sub-receivers, termed "fingers" of the rake, that each decode a multipath component. For each path, the channel is flat by design, i.e., the channel has one tap for each finger, such that the PN codes would normally remain orthogonal.

The BS 110 also comprises a processor or controller 293, a memory 295, one or more network interface units 297. The controller 293 supplies data (in the form of transmit signals) to a transmitter for downlink transmissions and processes uplink signals received from the combiner 120, as described herein. In addition, the controller 293 performs other transmit and receive control functionality. Parts of the functions of transmit and receive circuits, and the controller 293 may be implemented in a modem. It should be understood that there are A/D converters and digital-to-analog converters in the various signal paths to convert between analog and digital signals. In this example, A/D converters 230(1)-230(N) and 240 are shown.

The network interface units 297 are configured to provide an interface to a telephone system and/or a service provider network or gateway for bidirectional voice and data communication. The network interface units 297 may also receive configuration commands from a network management station.

The controller 293 is, for example, a signal or data processor that operates with the memory device 295 or other data storage block that stores data used for the techniques described herein. The memory 295 may be separate or part of the controller 293. Instructions for performing the various functions described herein, e.g., instructions for operating the RRH selector and mapper module 280, may be stored in the memory 295 for execution by the controller 293. In other words, the operations of the module 280 may be performed the controller 293 even though the module 280 is shown as a separate component or entity in the figure.

The functions of the controller 293 may be implemented by logic encoded in one or more tangible non-transitory media (e.g., embedded logic such as an application specific integrated circuit, digital signal processor instructions, software that is executed by a processor, etc.), wherein the memory 295 stores data used for the computations described herein and stores software or processor instructions that are executed to carry out the computations described herein. Thus, operations performed by the BS 110 may take any of a variety of forms, so as to be encoded in one or more computer readable tangible media (e.g., a memory device) for execution, such as with fixed logic or programmable logic (e.g., software/computer instructions executed by a processor) and the controller 293 may be a programmable processor, programmable digital logic (e.g., field programmable gate array) or an application specific integrated circuit (ASIC) that comprises fixed digital logic, or a combination thereof. For example, the controller 293 may be a modem in the base station and thus be embodied by digital logic gates in a fixed or programmable digital logic integrated circuit, which digital logic gates are configured to perform the techniques described herein. In another form, instructions may be embodied in a processor readable medium that is encoded with instructions for execution by a processor (e.g., controller 293) that, when executed by the processor, are operable to cause the processor to perform the functions described herein.

It is to be understood that any of the devices shown in the various figures herein may be equipped with processors or controller, memories, and interfaces such as those described above in connection with BS 110. In addition, to simplify the drawing, some support circuits or modules have been omitted from the figures.

Figure 3:
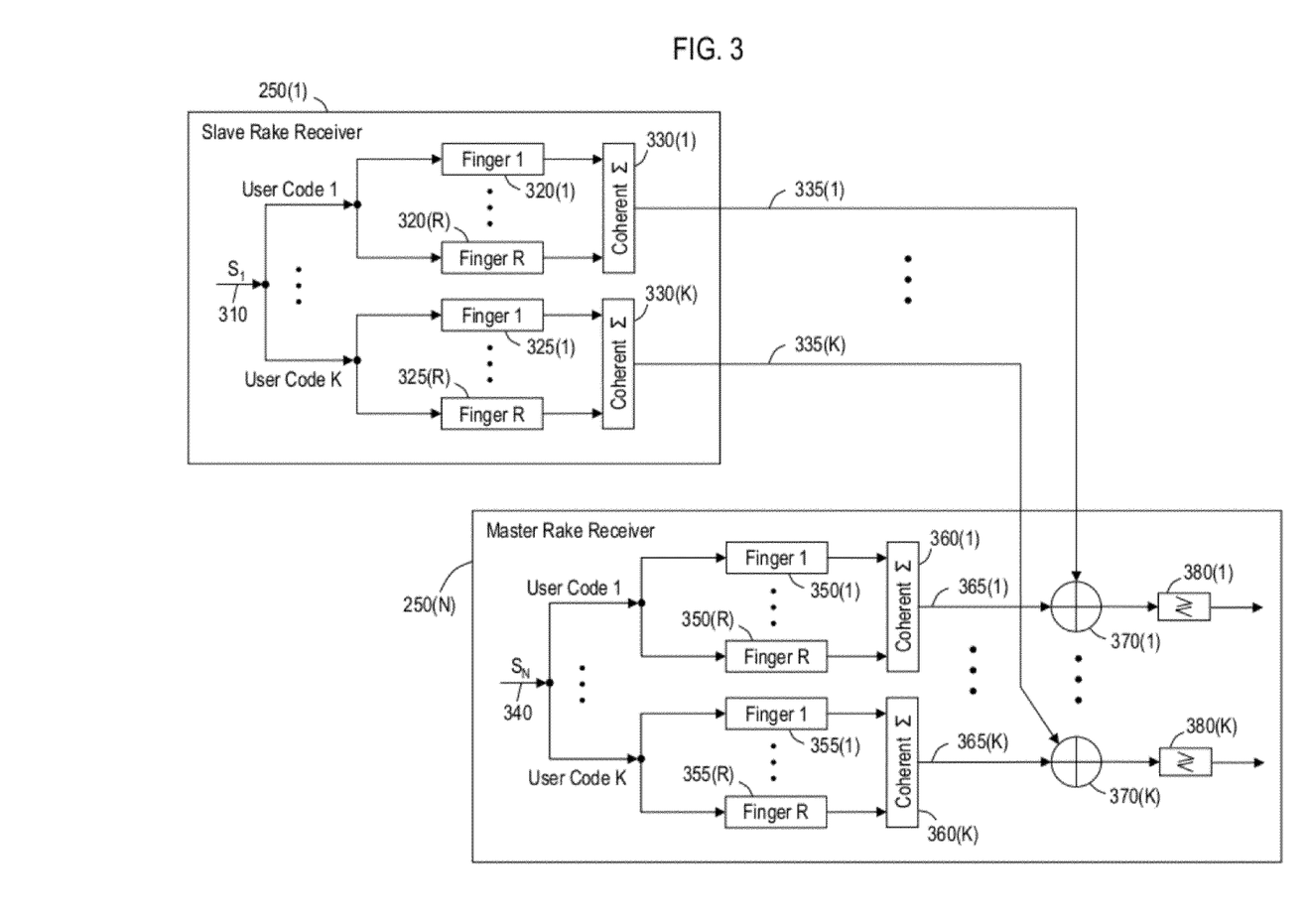
FIG. 3 is a block diagram that depicts an example of a master rake receiver and slave rake receivers in the base station shown in FIG. 2 that are configured to process combined signals according to the techniques described herein.

Turning now to FIG. 3, a diagram is shown that depicts an example of a master and slave rake receiver from the BS 110 shown in FIG. 2. At reference numeral 310, a first signal $S_1$ is received at slave rake receiver 250(1). Signal $S_1$ is, e.g., a signal on output line 225(1) that has been digitized by A/D converter 230(1). Signal $S_1$ is distributed to K rake receiver finger groups that have each been assigned one of the K user codes, as shown. The first rake receiver finger group comprises R fingers 320(1)-320(R). The R fingers are able to correlate R multipath signals for user code 1. The multipath signals are coherently combined or summed by coherent combiner or adder 330(1) to produce output 335(1). The last, or Kth, receiver finger group comprises R fingers 325(1)-325(R) that correlate R multipath signals for user code K. The multipath signals are coherently combined by coherent adder 330(K) to produce output 335(K). The outputs 335(1)-335(K) represent the "soft" outputs of the associated finger groups. For simplicity, the intermediate finger groups 2 through K-1 are not shown.

Referring to master rake receiver 250(N), at reference numeral 340, an Nth signal $S_N$ is received at the master rake receiver 250(N). Signal $S_N$ is, e.g., a signal on output line 225(N) that has been digitized by A/D converter 230(N). Signal $S_N$ is distributed to K rake receiver finger groups that have each been assigned one of the K user codes, as shown. The first rake receiver finger group comprises R fingers 350(1)-350(R). The R fingers are able to correlate R multipath signals for user code 1. The multipath signals are coherently combined or summed by coherent adder 360(1) to produce output 365(1). The Kth receiver finger group comprises R fingers 355(1)-355(R) that correlate R multipath signals for user code K. The multipath signals are coherently combined by coherent adder 360(K) to produce output 335(K). The outputs 335(1)-335(K) represent the "soft" outputs of the associated finger groups. For simplicity, the intermediate finger groups 2 through K-1 are not shown.

All of the N soft output signals produced by rake receivers 250(1)-250(N) and associated with user code 1 are added together by summer circuit 370(1) and fed to decoder 380(1). Decoder 380(1) outputs the "hard" decisions with reference to symbols received and coded by user code 1. Similarly, all of the N soft output signals produced by rake receivers 250(1)-250(N) and associated with user code K are added together by summer circuit 370(K) and fed to decoder 380(K). Decoder 380(K) outputs the hard decisions with reference to symbols received and coded by user code K. For simplicity, the intermediate summers and decoders for soft outputs associated with user codes 2 through K-1 are not shown.

Figure 4:
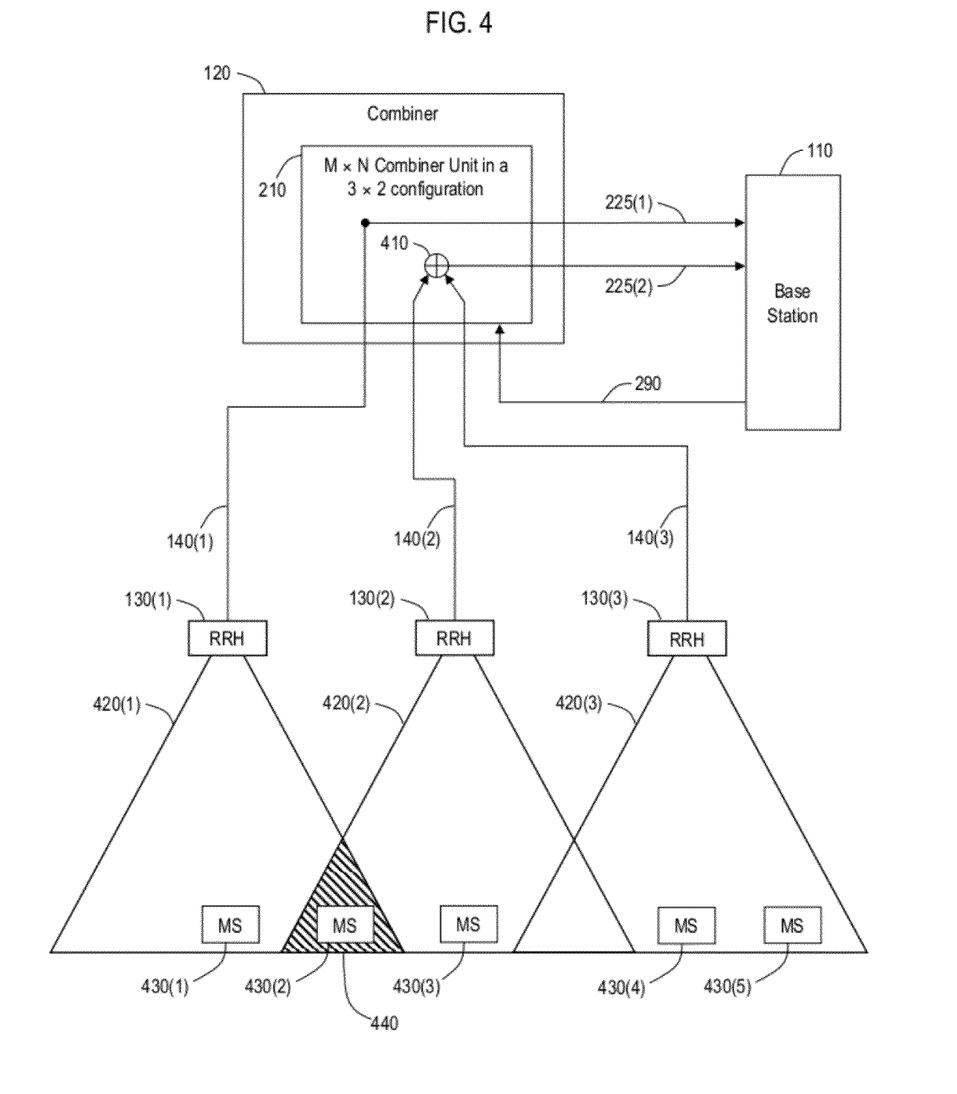
FIG. 4 is a block diagram that depicts interference among a plurality of mobile subscriber stations in a distributed antenna system environment and how the interference is mitigated according to the techniques described herein.

Referring now to FIG. 4 also with reference to FIGS. 1 and 2, the BS 110, the combiner 120, and three of the RRHs 130(1)-130(3) from FIG. 1 are shown. Also shown is the M×N combiner unit 210 from FIG. 2, and various communications lines from FIGS. 1 and 2. In this example, control information or a control signal sent on communications line 290 from BS 110 has configured the M×N combiner unit 210 to be in a 3×2 combiner configuration, e.g., the three signals received on data lines 140(1)-140(3) are combined into two output lines 225(1) and 225(2) for signals sent to the BS 110. The BS 110 uses two rake receivers, e.g., a single slave rake receiver and the master rake receiver, to process the signals received over the two output lines 225(1) and 225(2). Accordingly, signals received on data line 140(1) are passed by combiner unit 210 to output line 225(1) and signals received on data lines 140(2) and 140(3) are combined by summer 410 into output line 225(2). The choice to combine signals received on data lines 140(2) and 140(3) is made by monitoring one or more parameters associated with signals received on data lines 140(1)-140(3), as described above.

FIG. 4 depicts simple example RF reception patterns 420(1)-420(3) that indicate a primary reception area covered by RRHs 130(1)-130(3), respectively. For ease of illustration, the three RRHs 130(1)-130(3) are depicted in a horizontally linear arrangement from left to right. It should be understood that the three RRHs 130(1)-130(3) may be in any geometry that affords some proximity to the base station, e.g., the three RRHs 130(1)-130(3) could be on three different floors of a hotel or office building, or housed in three different buildings that are somewhat close together.

Also illustrated in FIG. 4 are mobile subscribers (MSs) 430(1)-430(5). MSs 430(1)-430(5) are shown in respective reception areas 420(1)-420(3). In this example, MS 430(2) falls within a region 440 where reception areas 420(1) and 420(2) overlap. When using a traditional combiner, all of the uplink signals from MSs 430(1)-430(5) are combined into a single output stream for transmission to the base station. Each of the remote RRHs 130(1)-130(3) may or may not receive some signals, either directly or via multipath, from each of the MSs 430(1)-430(5). When all of the uplink signals are traditionally summed into a single output stream, uplink signal orthogonality is lost or reduced, thereby increasing the interference among MSs 430(1)-430(5), and thus reducing system capacity.

The techniques described herein reduce interference by keeping uplink paths on data lines 140(1)-140(3) separate until reaching the M×N combiner unit 210. For example, uplink signals on data line 140(1) are isolated from signals on data lines 140(2) and 140(3), and are passed directly to a rake receiver in BS 110 by output line 225(1). Thus, MSs 430(1) and 430(2) do not experience interference from MSs 430(3)-430(5) with regard to signals on output line 225(1). However, uplink signals from MSs 430(2)-430(5) sent on links 140(2) and 140(3) are combined by summer 410 to produce signals on output line 225(2). Accordingly, MSs 430(2) and 430(3) in reception area 420(2) will interfere with MSs 430(4) and 430(5) in reception area 420(3) and vice versa.

The base station may monitor various signal parameters and decide that other uplink paths should be combined, e.g., signals on data lines 140(1) and 140(2), or 140(1) and 140(3), while leaving the signals on the remaining data line uncombined in the 3×2 combiner configuration. Interference could be reduced even further by adding an additional slave rake receiver such that there is a one-to-one correspondence between data lines 140(1)-140(3) and rake receivers in BS 110.

Figure 5:
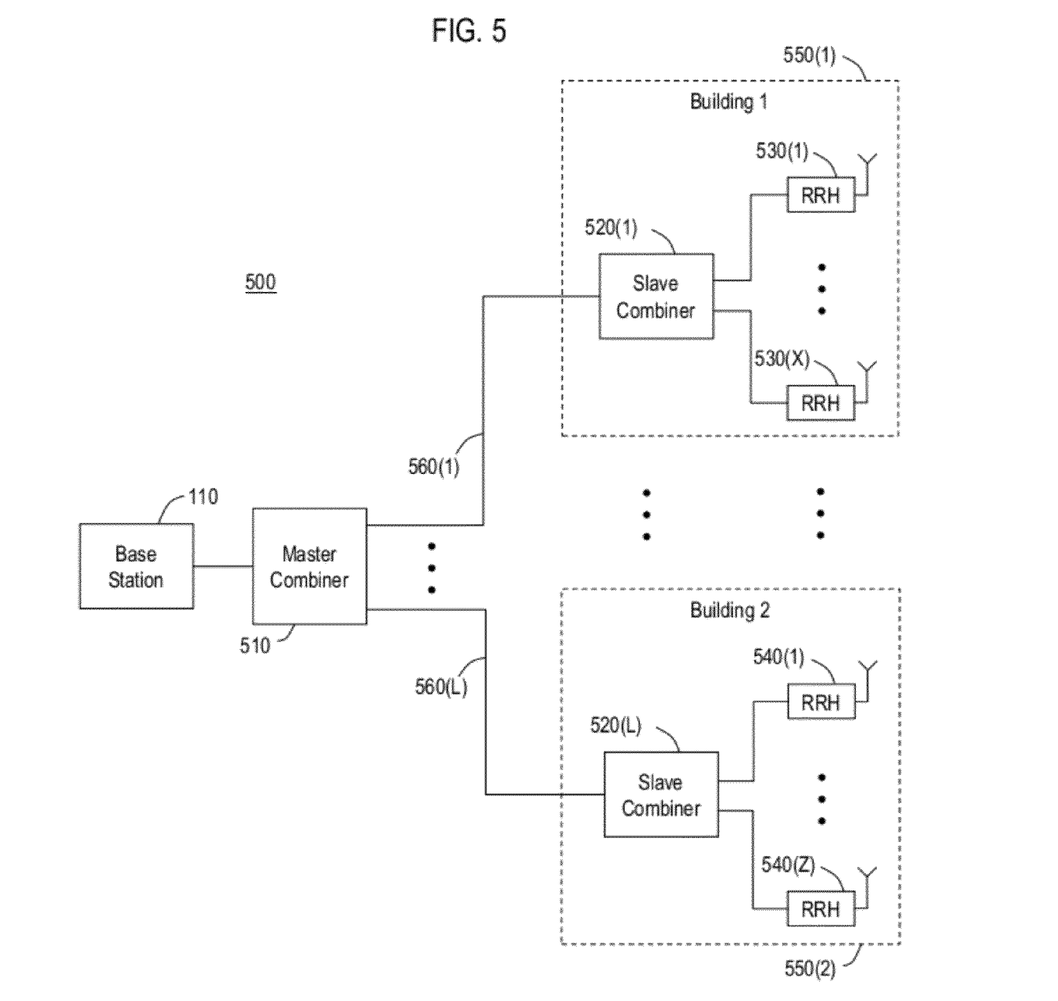
FIG. 5 is a block diagram showing an example of a network comprising a base station, a master combiner, and slave combiners, where the slave combiners are configured to combine signals received from remote radio head devices according to the techniques described herein.

Reference is now made to FIG. 5, with additional reference to FIG. 1, for a description of a wireless communication system 500 comprising the BS 110 from FIG. 1, a master combiner 510, slave combiners 520(1)-520(L), and sets of RRHs 530(1)-530(X) and 540(1)-540(Z). The set of RRHs 530(1)-530(X) are associated with a first building 550(1) and the set of RRHs 540(1)-540(Z) are associated with relatively nearby second building 550(2). The architecture shown in FIG. 5 is a "distributed" architecture when compared to the flat architecture shown in FIG. 1. In this example, there are slave combiners for each set of RRHs, e.g., there is one slave combiner 520(1) for RRHs 530(1)-530(X) and one slave combiner 520(L) for RRHs 540(1)-540(Z). For ease of illustration, slave combiners 520(2) through 520(L-1) and the corresponding sets of RRHs are not shown.

Uplink signals from each set of RRHs are combined by their respective slave combiners and sent to the BS 110 over data lines 560(1)-560(L). The data lines 560(1)-560(L) are analogous to data lines 140(1)-140(M) from FIG. 1. The distributed architecture shown in FIG. 5 has some advantages over the flat architecture of FIG. 1. First, as shown in FIG. 1, each RRH has to have its own cable for individual data lines 140(1)-140(M) for uplink signals sent to the combiner 120, usually located near the BS 110. Second, if the number of rake receivers in the base station is less than M, then some of the signals from the various RRHs will have to be combined by the M×N combiner unit 210 within combiner 120. Lastly, if the RRHs in FIG. 1 are distributed throughout several buildings, then a full length cable will have to be provided from each RRH in the various buildings to the combiner 120.

By way of example, when using the distributed architecture shown in FIG. 5, uplink signals from sets of RRHs may be combined by slave combiners, e.g., uplink signals from RRHs 530(1)-530(X) may be combined by slave combiner 520(1) and sent over a single data line 560(1) thereby simplifying wiring from building 550(1) to master combiner 510. The various configurations and capabilities described in connection system 100 may also be applied to system 500.

Figure 6:
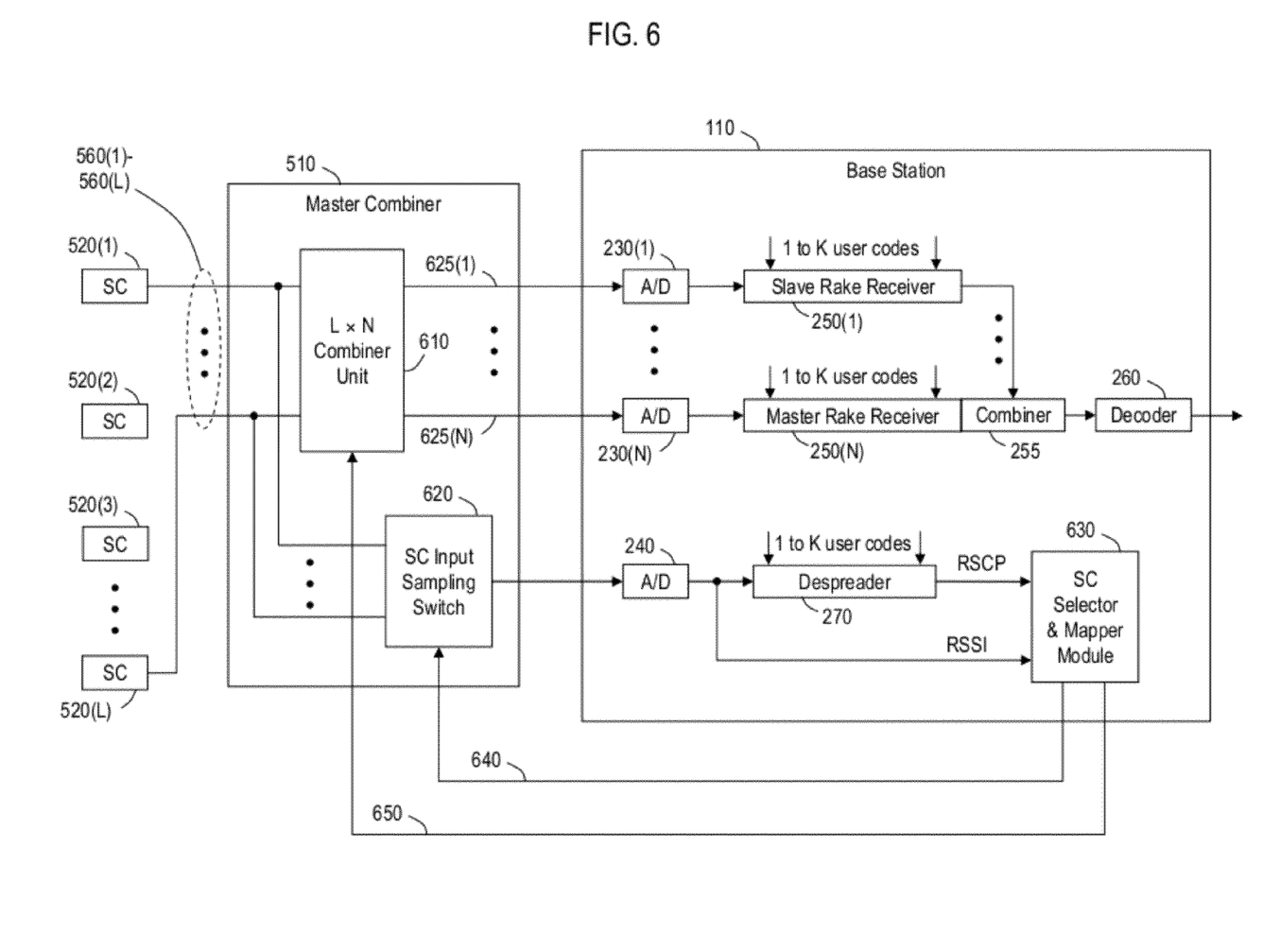
FIG. 6 is a block diagram of an example of a combiner and base station combination configured to process signals from a plurality of slave combiners according to the techniques described herein.

Referring to FIG. 6, an example master combiner and base station combination is shown that is configured to process signals from a plurality of slave combiners. FIG. 6 shows the BS 110, the master combiner 510, and the plurality of slave combiners (SCs) 520(1)-520(L) from FIG. 5. The master combiner may receive uplink signals via individual data lines 560(1)-560(L), as shown collectively by the dashed oval.

The master combiner 510 has an L×N combiner or mapper unit 610 and a slave combiner input sampling switch 620. The L×N combiner unit 610 is configured to combine the L input signals from data lines 560(1)-560(L) into N output signals 625(1)-625(N) based on a mapping function or other supplied information to be described hereinafter. In this example, output signals 625(1)-625(N) are analog signals that are fed to respective A/D converters 230(1)-230(N) within the BS 110 for conversion to digital signals. The digitized signals are then fed to respective rake receivers 250(1)-250(N). The rake receivers are fed user codes corresponding to K users known to be operating within system 500 in order to correlate multipath signals from each user.

In this example, rake receivers 250(1)-250(N-1) are designated as "slave" rake receivers and rake receiver 250(N) is designated a "master" rake receiver as described in connection with FIG. 3. The correlated multipath signals from each radio chain is then combined by combiner 255 and forwarded to decoder 260 for further processing.

Within the master combiner 510, the input signals from data lines 560(1)-560(L) are tapped and fed to slave combiner input sampling switch 620. The slave combiner input sampling switch 620 selects one of the input signals to be monitored by the BS 110. The selected signal is sent to A/D converter 240 for conversion to a digital signal. One or more parameters associated with the digital signal are monitored by the BS 110. The output of the A/D converter 240 is sent through despreader 270. The output of the despreader 270 is sent to slave combiner selector and mapper module 630. In this example, the output of the despreader 270 is monitored for RSCP. Before the despreader 270, the digital signal may be tapped and sent directly to slave combiner selector and mapper module 630 for RSSI monitoring. The functions of the despreader 270 and the slave combiner selector and mapper module 630 may be implemented in the master combiner 510 instead of the BS 110.

The slave combiner selector and mapper module 630 provides a feedback signal 640 to the slave combiner input sampling switch 620 in order to periodically trigger switching through each of the input signal paths 560(1)-560(L). By periodically monitoring the input signals, the slave combiner selector and mapper module 630 can generate a mapping function for the L×N combiner unit 610. Information identifying or describing the mapping function is sent to the master combiner 510 (in which the L×N combiner unit 610 resides) via communication line 650. Although FIGS. 5 and 6 have described the use of slave combiners, any combination of slave combiner, RRHs, and signal paths may be employed, e.g., an RRH may be directly connected to master combiner 510 without an intermediate slave combiner.

Figure 7A:
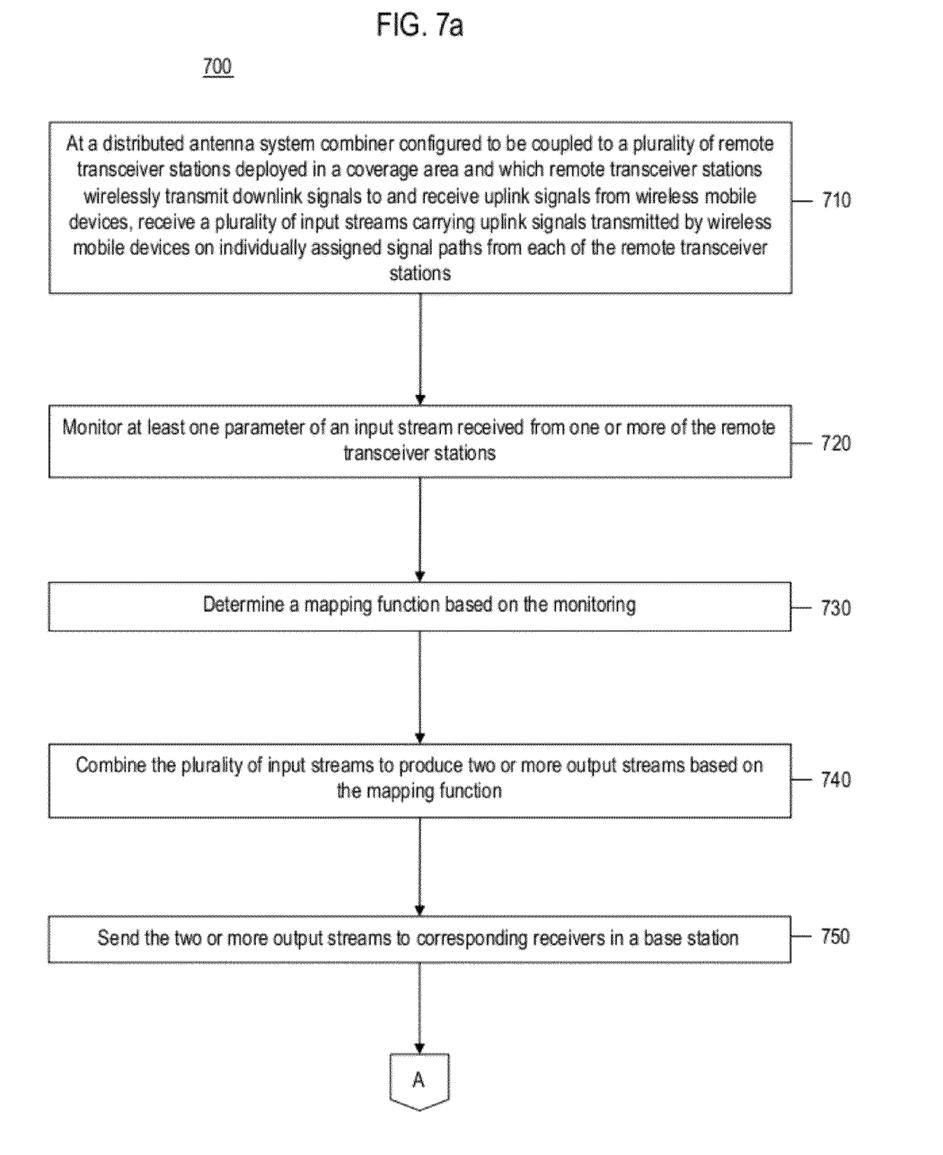
FIGS. 7a and 7b depict a flowchart of a process for combining uplink signals at the combiner and base station combination according to the techniques described herein.
Figure 7B:
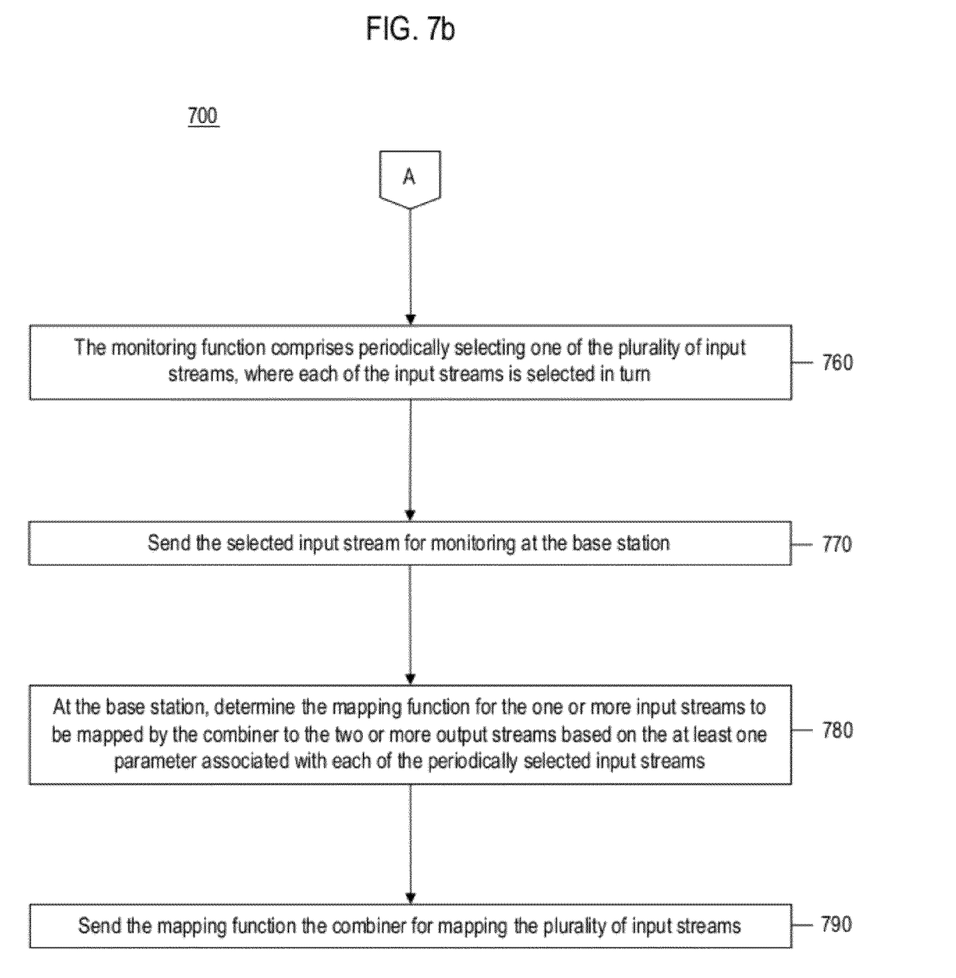

Referring now to FIGS. 7a and 7b, an example flowchart is shown that generally depicts a process 700 for mapping and combining input streams to output streams, e.g., for mappings used by the M×N combiner unit 210 or the L×N combiner unit 610. At 710, at a distributed antenna system combiner that is configured to be coupled to a plurality of remote transceiver stations deployed in a coverage area and which remote transceiver stations wirelessly transmit downlink signals to and receive uplink signals from wireless mobile devices, a plurality of input streams carrying uplink signals transmitted by wireless mobile devices are received on individually assigned signal paths from each of the remote transceiver station. The input streams may comprise a combination of RRH uplink signals, e.g., signals combined by a slave combiner as described above.

At 720, at least one parameter of an input stream received from one or more of the remote transceiver stations is monitored. The parameters may include RSCP, RSSI, CIR, or other RF parameters as described above. At 730, a mapping function is determined based on the monitoring. At 740, the plurality of input streams are combined to produce the two or more output streams based on the mapping. And at 750, the two or more output streams are sent to corresponding receivers in a base station. A description of the monitoring and mapping functions of process 700 continues from off page connector A to FIG. 7*b*.

At 760, the monitoring function comprises periodically selecting one of the plurality of input streams for monitoring by the base station. Each of the input streams is selected in turn. At 770, the selected input stream is sent to the base station for monitoring. At 780, a mapping function is determined at the base station for the one or more input streams to be mapped by the combiner to the two or more output streams based on the at least one parameter associated with each of the periodically selected input streams. At 790, information identifying or describing the mapping function is sent to the combiner for mapping the plurality of input streams. An example of how mapping may be performed, e.g., using CIR or RSSI, is described in connection with FIGS. 8*a* and 8*b*.

Figure 8A:
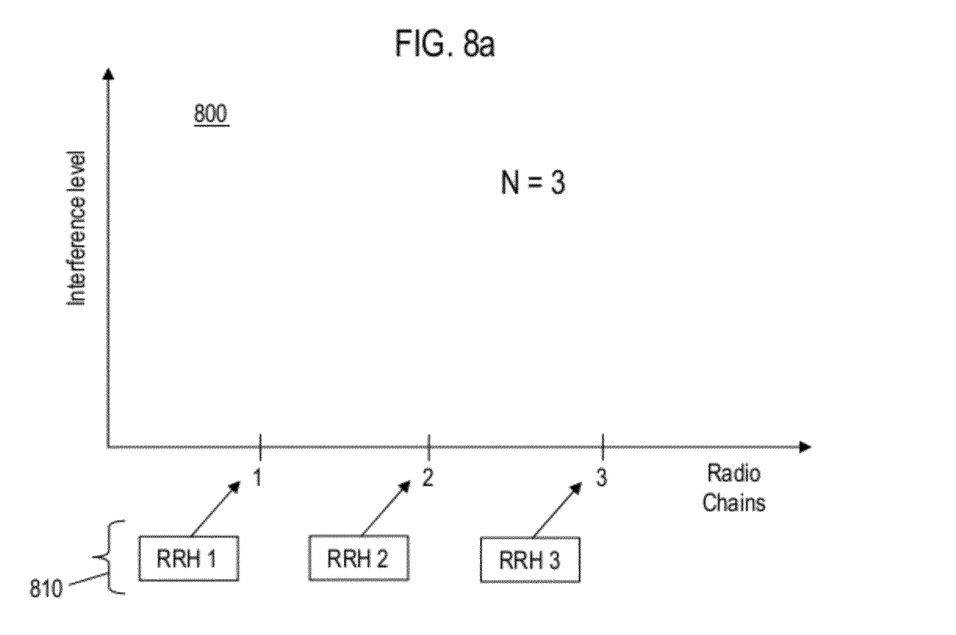
FIGS. 8a and 8b are diagrams showing examples of mapping signals from remote radio heads to radio chains according to the techniques described herein.
Figure 8B:
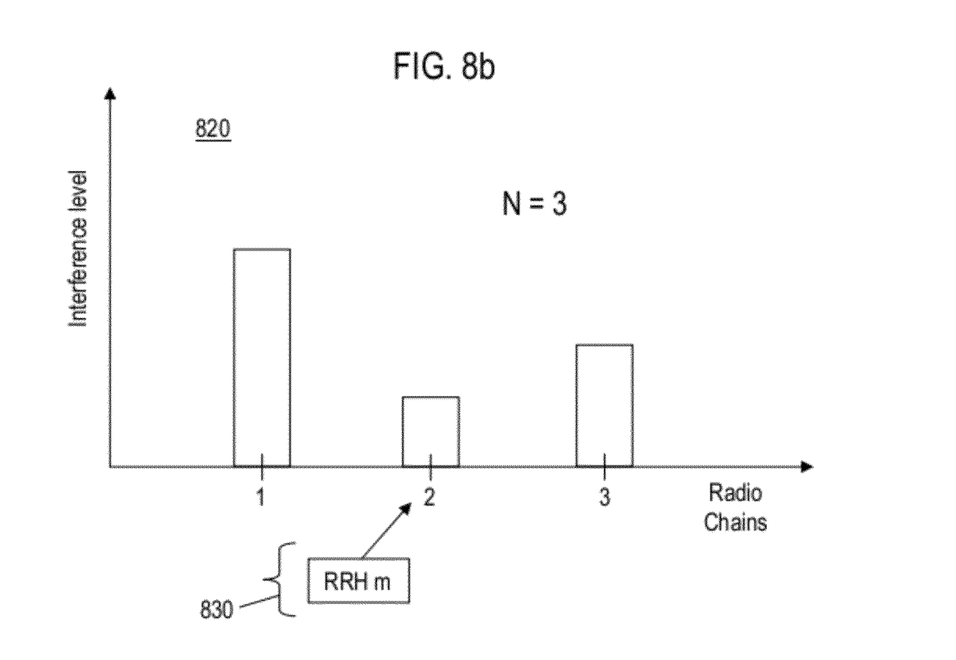

Referring to FIGS. 8*a* and 8*b*, diagrams depicting an example mapping function of RRHs to radio chains will now be described. At 800, the system is initialized such that each of the radio chains 1, 2, and 3 has a stored or monitored interference level of zero. At 810, the mapping module begins to assign RRHs to the radio chains 1, 2, and 3. In this example, the first three RRHs 1-3 are assigned to the radio chains 1, 2, and 3, respectively.

At 820, after a period of time the input signals from the RRHs are sampled and an interference level for each radio chain is maintained in the base station, e.g., BS 110, and plotted in the diagram as shown. In this example, radio chain 1 has the highest interference level, followed by radio chain 3, and radio chain 2 has the lowest interference level. At 830, an additional RRH m is ready to be mapped to a radio chain. Since radio chain 2 has the lowest interference level, RRH m is mapped to radio chain 2. Thereafter, the uplink radio signals from RRH m will be combined with the uplink signals from other RRHs, e.g., RRH 2, that have been previously assigned to radio chain 2. The same algorithm may be applied to signals combined using slave combiners.

In another example, the RRHs are sorted according to a monitored parameter, e.g., M RRHs are sorted in increasing order of received RSSI. An interference monitoring variable associated with each of the radio chains is initialized to zero interference. Each of the sorted RRHs from 1 to M is then assigned to a radio chain with the least interference at the time of assignment. Intuitively, this algorithm is like "joining the shortest queue". Over time, the interference levels of the various radio chains will change. The above process may be repeated, or if enough information has been gathered by the base station, the base station may make an intelligent decision to move one RRH from one radio chain to another radio chain.

In summary, a combiner is provided that is configured to be coupled to a plurality of remote transceiver stations deployed in a coverage area and which wirelessly transmit downlink signals to and receive uplink signals from wireless mobile devices. A plurality of input streams that carry uplink signals transmitted by wireless mobile devices are received on individually assigned signal paths from each of the remote transceiver stations. At least one parameter of an input stream received from the one or more of the remote transceiver stations is monitored. A mapping function is determined based on the monitoring. The plurality of input streams are combined based on the mapping function to produce the two or more output streams and the two or more output streams are sent to corresponding receivers in a base station.

Furthermore, one of the plurality of input streams is periodically selecting for monitoring by the base station. Each of the input streams is selected in turn, and sent to the base station for monitoring. At the base station, a mapping function is determined for the one or more input streams to be mapped by the combiner to the two or more output streams based on the at least one parameter. Information identifying or describing the mapping function is sent to the combiner. The mapping function may be configured to minimize overall interference in the plurality of input streams, e.g., an input stream is assigned output stream that has a lowest interference level.

The techniques described herein may be embodied in one or more computer readable storage media storing software comprising computer executable instructions that, when executed, are operable to: monitor at least one parameter of a plurality of input streams received from one or more of the remote transceiver stations, the input streams carrying uplink signals transmitted by wireless mobile devices on individually assigned signal paths from each of a plurality of remote transceiver stations in a coverage area; determine a mapping function based on the monitored parameter; combine the plurality of input streams to produce two or more output streams based on the mapping function; and send the two or more output streams to corresponding receivers in a base station.

The monitoring of the at least one parameter may comprise monitoring one or more of an RSSI of an input stream, RSCP of an active channel, and a CIR. In addition, signals received at two of the one or more individual remote transceiver stations may be combined into a single input stream. The receivers may be configured to correlate multipath signals received from the wireless mobile devices according to known user codes of the wireless mobile devices to produce an output signal for each user code. The output signals for each user code from each of the receivers may be combined at a designated master receiver configured to generate a digital data stream for decoding. The receivers may comprise rake receivers associated with the base station comprising a CDMA based base station.

An advantage of the techniques described herein is that overall uplink interference is reduced. The two main sources of uplink interference in UMTS and CDMA systems are: 1) mutual interference caused by users on the uplink, and 2) interference resulting from operations in a macro/femto system served by closely spaced RRHs. Accordingly, the techniques described herein provide a higher Signal-to-Interference Ratio (SINR) that directly leads to increased voice and/or data capacity in the wireless system.

The above description is intended by way of example only.

What is claimed is:
1. A method comprising:
   receiving a plurality of input streams carrying uplink signals transmitted by wireless mobile devices on individu- ally assigned signal paths from each of a plurality of remote transceiver stations deployed in a coverage area;

monitoring at least one parameter of an input stream received from one or more of the remote transceiver stations;

determining a mapping function to minimize overall interference in the plurality of input streams based on the monitoring;

assigning an input stream to an output stream that has a lowest interference level;

combining the plurality of input streams to produce two or more output streams based on the mapping function and the assigning; and sending the two or more output streams to corresponding receivers in a base station.

2. The method of claim 1, further comprising:

periodically selecting one of the plurality of input streams for monitoring, wherein each of the input streams is selected in turn; and sending the selected input stream for monitoring.

3. The method of claim 2, further comprising:

determining the mapping function based on the at least one parameter associated with each of the periodically selected input streams; and sending information identifying or describing the mapping function to the combiner.

4. The method of claim 1, wherein monitoring comprises monitoring one or more of a received signal strength information of an input stream, received signal code power of an active channel, and a carrier-to-interference ratio.

5. The method of claim 1, further comprising combining signals received at two of the one or more individual remote transceiver stations into a single input stream.

6. The method of claim 1, further comprising:

at the receivers in the base station, correlating multipath signals received from the wireless mobile devices according to known user codes of the wireless mobile devices to produce an output signal for each user code; and combining the output signals for each user code from each of the receivers at a designated master receiver configured to generate a digital data stream for decoding.

7. An apparatus comprising:

a combiner unit configured to be coupled to a plurality of remote transceiver stations, and to receive a plurality of input streams carrying uplink signals transmitted by wireless mobile devices on individually assigned signal paths from each of the remote transceiver stations in order to combine the plurality of input streams to produce two or more output streams based on a mapping function; and a controller configure to monitor at least one parameter of an input stream received over the individually assigned signal paths, and determine the mapping function to minimize overall interference in the plurality of input streams based on the at least one parameter such that the mapping function assigns an input stream to an output stream that has a lowest interference level.

8. The apparatus of claim 7, further comprising a sampling switch configured to periodically select one of the plurality of input streams and send the selected input stream for monitoring by the controller.

9. The apparatus of claim 8, wherein the controller is configured to determine the mapping function based on the at least one parameter associated with each of the periodically selected input streams and to send information identifying or describing the mapping function to the combiner unit.

10. The apparatus of claim 7, wherein the controller is configured to monitor one or more of a received signal strength information of an input stream, received signal code power of an active channel, and a carrier-to-interference ratio.

11. A system comprising:

a plurality of remote transceiver stations deployed in a coverage area and which remote transceiver stations wirelessly transmit downlink signals to and receive uplink signals from wireless mobile devices;

a combiner unit configured to be coupled to a plurality of remote transceiver stations, and to receive a plurality of input streams carrying uplink signals transmitted by wireless mobile devices on individually assigned signal paths from each of the remote transceiver stations in order to combine the plurality of input streams to produce two or more output streams based on a mapping function;

a controller configured monitor at least one parameter of an input stream received over the individually assigned signal paths, and determine the mapping function to minimize overall interference in the plurality of input streams based on the at least one parameter such that the mapping function assigns an input stream to an output stream that has a lowest interference level; and a base station comprising a plurality of receivers configured to receive the two or more output streams, wherein one of the receivers is designated as a master receiver.

12. The system of claim 11, and further comprising switch configured to periodically select one of the plurality of input streams and send the selected input stream for monitoring by the controller.

13. The system of claim 12, wherein the controller is configured to determine the mapping function based on the at least one parameter associated with each of the periodically selected input streams and send information identifying or describing the mapping function to the combiner unit.

14. The system of claim 11, wherein the controller is configured to monitor one or more of a received signal strength information of an input stream, received signal code power of an active channel, and a carrier-to-interference ratio.

15. The system of claim 11, and further comprising one or more slave combiners configured to combine signals received at two of the one or more remote transceiver stations into a single input stream for transmission on a corresponding individually assigned signal path.

16. The system of claim 11, wherein the plurality of receivers are configured to correlate multipath signals received from the wireless mobile devices according to known user codes of the wireless mobile devices to produce an output signal for each user code, and wherein the master receiver is configured to combine the output signals for each user code from each of the receivers to generate a digital data stream for decoding.

17. One or more non-transitory computer readable storage media storing software comprising computer executable instructions that, when executed, are operable to:

monitor at least one parameter of a plurality of input streams received from one or more of the remote transceiver stations, the input streams carrying uplink signals transmitted by wireless mobile devices on individually assigned signal paths from each of a plurality of remote transceiver stations in a coverage area;

determine a mapping function to minimize overall interference in the plurality of input streams based on the monitored parameter;

assign an input stream to an output stream that has a lowest interference level;

combine the plurality of input streams to produce two or more output streams based on the mapping function and the assignment; and send the two or more output streams to corresponding receivers in a base station.

18. The computer readable storage media of claim 17, and further comprising instructions that are operable to periodically select one of the plurality of input streams for monitoring, wherein each of the input streams is selected in turn, and send the selected input stream for monitoring.

19. The computer readable storage media of claim 18, wherein the instructions that are operable to determine the mapping function are operable to determine the mapping function based on the at least one parameter associated with each of the periodically selected input streams, and to send information identifying or describing the mapping function to a combiner apparatus.

20. The computer readable storage media of claim 17, wherein the instructions that are operable to monitor comprise instructions that are operable to monitor one or more of a received signal strength information of an input stream, received signal code power of an active channel, and a carrier-to-interference ratio.

\* \* \* \* \*